United States Patent
Wang et al.

(10) Patent No.: US 12,106,740 B2
(45) Date of Patent: Oct. 1, 2024

(54) SUPERVISED METRIC LEARNING FOR MUSIC STRUCTURE FEATURES

(71) Applicant: Lemon Inc., Grand Cayman (KY)

(72) Inventors: Ju-Chiang Wang, Los Angeles, CA (US); Jordan Smith, London (GB); Wei Tsung Lu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 121 days.

(21) Appl. No.: 17/502,890

(22) Filed: Oct. 15, 2021

(65) Prior Publication Data

US 2023/0121764 A1   Apr. 20, 2023

(51) Int. Cl.
*G06F 17/00*   (2019.01)
*G06N 3/08*    (2023.01)
*G10H 1/00*    (2006.01)

(52) U.S. Cl.
CPC ............ *G10H 1/0008* (2013.01); *G06N 3/08* (2013.01); *G10H 2210/076* (2013.01); *G10H 2250/311* (2013.01)

(58) Field of Classification Search
CPC .......... G10H 1/0008; G10H 2210/076; G10H 2250/311; G06N 3/08
USPC .......................................................... 700/94
See application file for complete search history.

(56) References Cited

U.S. PATENT DOCUMENTS

| | | | |
|---|---|---|---|
| 2020/0074982 A1* | 3/2020 | McCallum | G06N 3/045 |
| 2021/0090535 A1* | 3/2021 | Miles | G10H 1/0008 |
| 2022/0156587 A1* | 5/2022 | Ebrahimpour | G06N 3/08 |

OTHER PUBLICATIONS

International Search Report mailed May 4, 2023 in International Application No. PCT/SG2022/050705.
Wang J.-C. et al., Supervised Chorus Detection for Popularmusic Using Convolutional Neural Network and Multi-Tasklearning. arXiv:2103.14253v2, Apr. 21, 2021, pp. 1-5 [Retrieved on Apr. 25, 2023] 1. Introduction, 2. Proposed Approach, 3. Experiments, Fig. 1.

(Continued)

*Primary Examiner* — Paul C McCord
(74) *Attorney, Agent, or Firm* — Faegre Drinker Biddle & Reath LLP

(57) ABSTRACT

Devices, systems, and methods related to implementing supervised metric learning during a training of a deep neural network model are disclosed herein. In examples, audio input may be received, where the audio input includes a plurality of song fragments from a plurality of songs. For each song fragment, an aligning function may be performed to center the song fragment based on determined beat information, thereby creating a plurality of aligned song fragments. For each song fragment of the plurality of song fragments, an embedding vector may be obtained from the deep neural network. Thus, a batch of aligned song fragments from the plurality of aligned song fragments may be selected, such that a training tuple may be selected. A loss metric may be generated based on the selected training tuple and one or more weights of the deep neural network model may be updated based on the loss metric.

20 Claims, 7 Drawing Sheets

(56) References Cited

OTHER PUBLICATIONS

Leander Van Boven, On Music Structure Analysis: Machine learning implementations of the Segmentation by Annotation approach. Jun. 30, 2020 [Retrieved on Apr. 25, 2023 from https://studenttheses.uu.nl/handle/20.500.12932/36522] 2.3 Music Structure Analysis, 2.4 SALAMI Dataset, 3.2 Feature Selection, 3.3 Proposed Architectures, 4.1 Evaluation Method, 4.2 Initial Test, 4.3 Final Results.
Namunu C Maddage et al., Automatic Structure Detection for Popular Music. Jan. 23, 2006 [Retrieved on Apr. 25, 2023 from htttps://www.ee.columbia.edu/~dpwe/papers/Maddage06-musstr.pdf] Whole document.

* cited by examiner

512

| Song_ID | TimeStamp₁ | TimeStamp₂ | Label |
|---|---|---|---|
| DE134A | 0:10 | 0:18 | A |
| DE134A | 0:53 | 1:01 | B |
| AB4D3C | 1:23 | 1:31 | B |
| EFF73F | 0:51 | 0:59 | C |
| DE134A | 1:21 | 1:29 | B |
| EFF73F | 0:17 | 0:25 | A |
| AB4D3C | 0:32 | 0:40 | B |
| AB4D3C | 0:02 | 0:1 | A |

| Song_ID_N | TimeStamp₁ | TimeStamp₂ | Label_N |
|---|---|---|---|

502

| Song_ID | Label |
|---|---|
| DE134A | A |
| DE134A | B |
| AB4D3C | B |
| EFF73F | C |
| DE134A | B |
| EFF73F | A |
| AB4D3C | B |
| AB4D3C | A |

| Song_ID_N | Label_N |
|---|---|

*Fig. 5*

SUPERVISED METRIC LEARNING FOR MUSIC STRUCTURE FEATURES

TECHNICAL FIELD

This disclosure relates to machine learning, particularly to methods and systems using supervised metric learning to train a deep neural network model.

BACKGROUND

In the field of Music Structure Analysis (MSA), many algorithms use conventional features such as Mel-Frequency Cepstral Coefficients (MFCCs) and Pitch Class Profiles (PCPs). Devising a suitable feature for MSA is challenging, since many aspects of music—including pitch, timbre, rhythm, and dynamics—are important in perceiving structure. Past MSA methods have combined input from multiple features; however, care must be taken when doing so at least because different features work better at different timescales than other features. While supervised learning methods have been used to model music boundaries and choruses, such supervised learning methods tend not to be compatible with existing MSA processing pipelines; instead, new post-processing methods are needed to implement such methods. Further, prior supervised learning approaches were limited to solving specific problems or versions of MSA; namely, segmentation and chorus detection. None of the prior approaches considered segmentation and labeling. There remains a need to develop a supervised learning approach that can minimize losses due to both segmentation and labeling tasks at the same time.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

In accordance with at least one example of the present disclosure, a method for implementing supervised metric learning during a training of a deep neural network model is described. The method may include implementing a deep neural network configured to receive a song and output embeddings representing the song and implementing a music structure analysis framework configured to receive the embeddings, segment the embeddings, and detect repeated portions of the song. In examples, a training of the deep neural network is implemented by supervised metric learning comprising: receiving audio input including a plurality of song fragments from a plurality of songs; for each song fragment of the plurality of song fragments, determining beat information; for each song fragment of the plurality of song fragments, performing an aligning function to center the song fragment based on the beat information, thereby creating a plurality of aligned song fragments; for each song fragment of the plurality of song fragments, obtaining an embedding from the deep neural network model; selecting a batch of aligned song fragments from the plurality of aligned song fragments, the batch of aligned song fragments being associated with a same song of the plurality of songs; sampling the selected batch of aligned song fragments and selecting a training tuple; generating a loss metric based on the selected training tuple; and updating one or more weights of the deep neural network model based on the loss metric.

In accordance with at least one example of the present disclosure, an apparatus for implementing supervised metric learning during a training of a deep neural network model is described. The apparats may include at least one processor and a non-transitory computer-readable medium storing therein computer program code including instructions for one or more programs that, when executed by the processor, cause the processor to: implement a music structure analysis framework configured to receive embeddings representing a song from a deep neural network model, segment the embeddings, and detect repeated portions of the song; and implement supervised metric learning during a training of the deep neural network model by: receiving audio input including a plurality of song fragments from a plurality of songs; for each song fragment of the plurality of song fragments, determining beat information; for each song fragment of the plurality of song fragments, performing an aligning function to center the song fragment based on the beat information, thereby creating a plurality of aligned song fragments; for each song fragment of the plurality of song fragments, obtaining an embedding from the deep neural network; selecting a batch of aligned song fragments from the plurality of aligned song fragments, the batch of aligned song fragments being associated with a same song of the plurality of songs; sampling the selected batch of aligned song fragments and selecting a training tuple comprising; generating a loss metric based on the selected training tuple; and updating one or more weights of the deep neural network model based on the loss metric.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

The implementations will be more readily understood in view of the following description when accompanied by the below figures, wherein like reference numerals represent like elements, and wherein:

FIG. 5 depicts details of example data structures in accordance with examples of the present disclosure.

DETAILED DESCRIPTION

Figure 1:
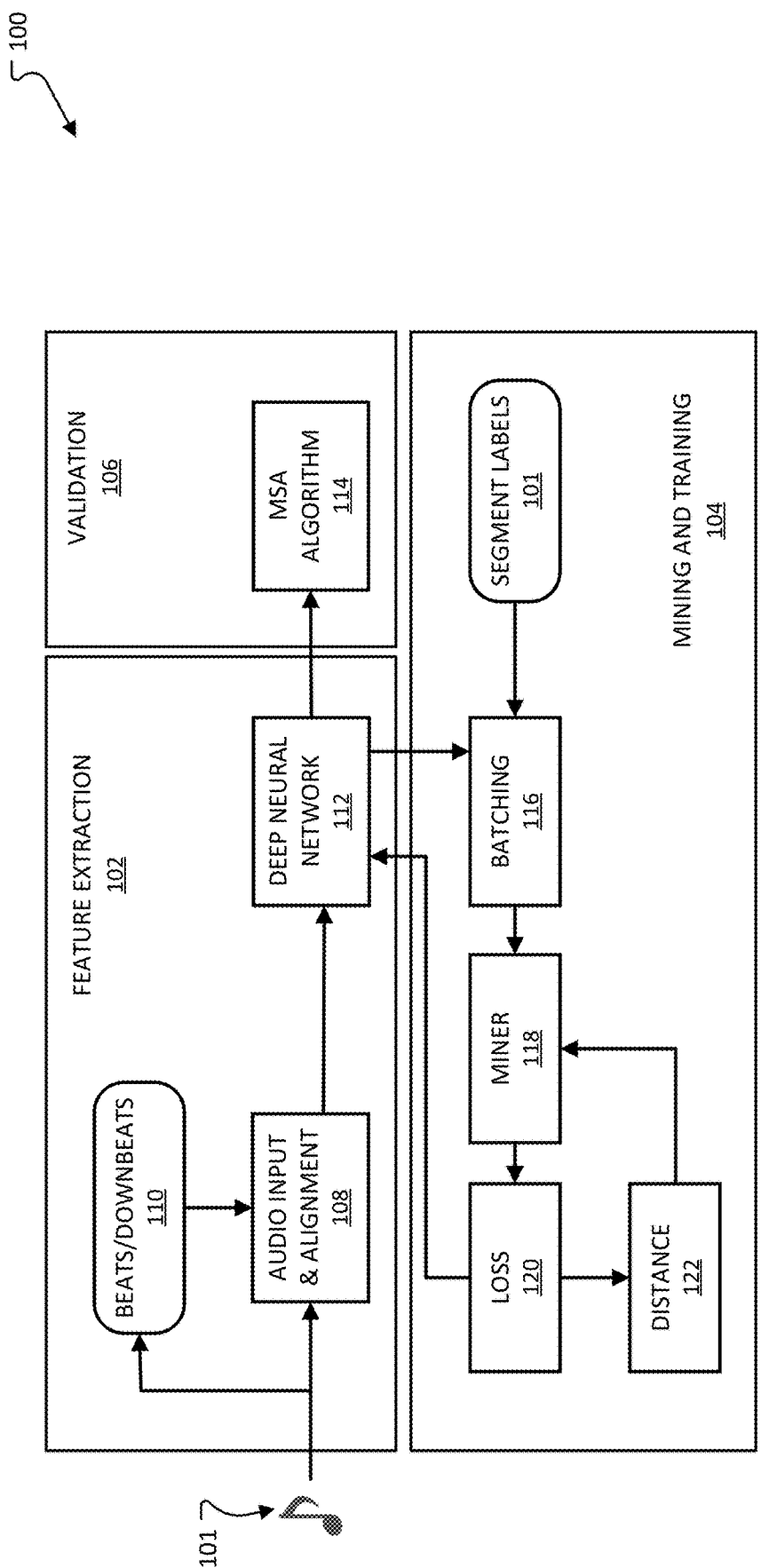
FIG. 1 depicts a block diagram of an example training platform in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Music structure analysis (MSA) methods traditionally search for musically meaningful patterns in audio, such as but not limited to homogeneity, repetition, novelty, and segment-length regularity. Hand-crafted audio features such as Mel-Frequency Cepstral Coefficient (MFCCs) or chromagrams are often used to elicit these patterns. However, as more annotations of section labels (e.g., verse, chorus, bridge) become available, supervised feature learning can be used to make these patterns even clearer and improve the performance of MSA methods. In accordance with examples of the present disclosure, a metric learning approach is utilized by training a deep neural network to provide embeddings that are near each other for two spectrogram inputs if both have the same section type (according to an annotation); otherwise the deep neural network provides embeddings that are far from one another. Accordingly, a batch sampling scheme may be used to ensure that the labels in a training pair are interpreted in a meaningful manner. The trained deep neural network model extracts features that can be used by existing MSA algorithms and generally improves the existing MSA algorithms in both intra-dataset and cross-dataset scenarios.

In accordance with examples of the present disclosure, supervised metric learning is utilized during the training of the deep neural network model, such for a given song, will embed audio fragments that lie in different sections far apart, and those from the same section closer. Accordingly, the model can better capture the homogeneity and repetition characteristics of song structure with respect to the section labels (e.g., verse, chorus, and bridge). To do so, a batch sampling scheme may be utilized to ensure the labels in a training pair are interpreted in a meaningful manner. By using the embeddings as features for an existing MSA algorithm, the supervised approach discussed herein can support both segmentation and labeling tasks. As the embeddings carry structural information of music, the embeddings can serve applications such as loop discovery, music creation, and automatic DJing.

While metric learning has been applied to improve MSA using unsupervised approaches; namely, audio fragments in a piece were presumed to belong to the same class if they were near each other in time, and to different classes otherwise, by design, many false positive and false negative pairs were used in training. In accordance with examples of the present disclosure, the supervision strategy discussed herein differs from previous approaches at least by developing supervised feature learning with a goal of improving existing MSA algorithms. An overview of a MSA algorithms, corpora, and evaluation methods is provided by Zhengshan Shi and Gautham J. Mysore. 2018. LoopMaker: *Automatic Creation of Music Loops from Pre-recorded Music.* In Proceedings of the 2018 CHI Conference on Human Factors in Computing Systems (CHI '18). Association for Computing Machinery, New York, NY, USA, Paper 454, 1-6. DOI:https://doi.org/10.1145/3173574.3174028, the disclosure of which is hereby incorporated by reference in its entirety for all purposes.

FIG. 1 depicts a block diagram of an example training platform in accordance with examples of the present disclosure. The block diagram 100 illustrated in FIG. 1, may comprise three stages. The first stage involves feature extraction stage 102; the second stage involves mining and training stage 104; and the third stage involves validation stage 106. In examples, the feature extraction stage 102 may include at least two modules. The audio features may first be synchronized at the audio input and alignment module 108 with the beat or downbeats of an audio input clip. Thus, the beats and downbeats may be determined, or estimated at the beats/downbeats module 110, aligned at the audio input & alignment module 108, and provided as audio inputs to train a deep neural network model 112. In examples, the beats and downbeats may be estimated at the beats/downbeats module 110 using a madmom approach. Thus, the trained deep neural network model 112 may provide the embedding vectors of a song as output for a subsequent MSA algorithm 114 to complete the task.

The mining and training stage 104 includes four modules: a batching module 116, a miner module 118, a loss module 120, and distance module 122. Batching involves splitting, at the batching module 110, the training data into batches having a fixed size. In order to allow for the occurrence of sensible comparisons among the training examples within a batch, a batch may contain only examples from the same song. The miner module 118 provides an algorithm to select informative training tuples (e.g., a pair having different labels but a large similarity) to compute a loss given the embeddings and labels of examples in a batch. While conventional metric learning methods generally use all tuples in a batch (or, sample them uniformly) to train the model, as the batch size grows, using an informative subset can speed up convergence and provide a better model and result.

In accordance with examples of the present disclosure, a MultiSimilarity loss function may be utilized by the loss module 120 to unify aspects of multiple weighting schemes in a music information retrieval (MIR) application, rather than using traditional contrastive loss and triple loss functions typically used in deep metric learning applications. Thus, a distance metric, as determined by the distance module 122, may specify the geometrical relationship among the output embeddings provided by the trained deep neural network. Common metrics include but are not limited to Euclidean distance and cosine similarity.

For a validation stage, a MSA algorithm 114 is adopted to generate the boundary and label outputs and validate the model learning status in terms of music structure analysis. While one or more open-source packages implementing one or more validation algorithms, including but not limited to a music structure analysis framework (MSAF), may be implemented, an algorithm for a different task could be utilized to tie the training to a different objective.

As previously discussed, the audio input and alignment module 108 may receive an audio input 101 and synchronize output embeddings with downbeats by aligning the center of an input window to the center of each bar interval. A similar procedure may be applied when aligning the center of the input window to the center of the detected beats. In examples, the input window may be longer than the duration of a bar, where the bar may be of a fixed length of time; thus, additional context audio may exist before and after the downbeat interval. A windowing function may be applied to the audio input 101 to modify or eliminate the audio context. As an example, an alone-mode may be applied to the audio input such that the context audio is zeroed out. As another example, a Hann-mode may be applied to the audio input, where the Hann-mode includes a Hann-shaped ramp from zero to one which is applied to the context audio. As another example, using a center-mode, the input window may be unaltered. In accordance with examples of the present disclosure, the Hann-mode was utilized, indicating that context audio is useful but ensuring the deep neural network model should focus on the signal round the center of the bar.

In examples, annotations of structure contain, for each section of audio input 101, two timestamps defining the interval and a label. Such labels may be explicit functions (e.g., intro, verse, chorus) or abstract symbols such as, but not limited to A, A', B, C, etc. indicating repetition. A training example may then be assigned with a label according to the label of the center in the audio input 101. As used herein, a training example aligned with the i-th beat/downbeat of the j-th song may be denoted as $s_i^j = (x_i^j, y_i^j)$, where x and y are the audio and label, respectively.

As previously mentioned, the proposed batch sampling algorithm implemented by the batching module 116 ensures that no cross-song examples are sampled in a batch. Therefore, when comparing examples within a batch, the labels provide meaning for supervision. For example, it is not desirable to compare a chorus fragment of song A with a chorus fragment of song B, since no a priori knowledge exist as to whether such chorus fragments should be embedded near to one another or far from one another in the space.

TABLE 1

Algorithm 1: One epoch of learning procedure.

| | |
|---|---|
| | Input: $\{[s_i^j]_{i=1}^{m_j}\}_{j=1}^{M}$, model $\Theta$, and batch size $\beta$ |
| | Output: Updated model $\hat{\Theta}$ |
| 1 | for j = 1 to M do |
| 2 | $\quad [s_{i'}^j]_{i'=1}^{m_j} \leftarrow$ shuffle sequence $[s_i^j]_{i=1}^{m_j}$ |
| 3 | $\quad n \leftarrow \lceil m_j/\beta \rceil$    // number of batches |
| 4 | $\quad$ if n > 1 then |
| 5 | $\quad\quad r \leftarrow n\beta - m_j$    // space in batch |
| 6 | $\quad\quad [s_{i'}^j]_{i'=1}^{n\beta} \leftarrow$ concat $[s_{i'}^j]_{i'=1}^{m_j}$ and $[s_{i'}^j]_{i'=1}^{r}$ |
| 7 | $\quad$ for k = 1 to n do |
| 8 | $\quad\quad \mathcal{B} \leftarrow \{s_{i'}^j\}$, i' = N(k − 1): min(Nk, $m_j$) |
| 9 | $\quad\quad \Theta \leftarrow$ update $\Theta$ with loss computed on $\mathcal{B}$ |

The algorithm in Table 1 provides an example procedure for one epoch, i.e., one full pass of the training dataset. An original input sequence including the various audio inputs 101 may be shuffled to ensure that the batches are diverse and contain song fragments throughout a song. Lines 4-6 of the algorithm ensure, when more than one batches are needed for a song, the last batch is full by duplicating examples within the song. Once a batch is sampled (line 8), a miner module 118 may be executed to select informative pairs from the batch to calculate the loss in order to provide an update the deep neural network model 112.

In examples, a MultiSimilarity framework may use three types of similarities to estimate the importance of a potential pair: self-similarity (Sim-S), positive relative similarity (Sim-P), and negative relative similarity (Sim-N). While many existing deep metric learning methods only consider one of these types when designing a loss function, by taking into account all three types of similarities, a MultiSimilarity framework provides weights for important pairs, thereby increasing performance and increasing accuracy.

As implemented by a MultiSimilarity framework, for an anchor $s_i^j$, an example $s_k^j$ will lead to a positive pair if the anchor and the example have the same label (i.e., $y_i^j = y_k^j$), and a negative pair otherwise (i.e., $y_i^j \neq y_k^j$). Thus, the miner module 118 may determine the Sim-P's for each positive/negative pair against an anchor, and select the challenging pairs when certain conditions are satisfied. At the loss phase, the loss module 120 may utilize the Sim-S's and Sim-N's to calculate weights for the positive and negative pairs, respectively, where the weights correspond to the gradients for updating the deep neural network model. To summarize, by using a MultiSimilarity framework, intra-class dissimilarity may be minimized by the miner module 118. The loss module 120 may simultaneously maximize intra-class similarity and minimize inter-class similarity. Stated another way, and in terms of music, a desired result is one that has fragments of a song with the same section type embedded in tight clusters, and clusters for different section types will be embedded in a manner such that they are far from one another.

With respect to the MSA algorithm 114, a typical input includes a sequence of feature vectors. The MSA algorithm 114 may then output a predicted timestamp and an abstract label for each audio segmented identified by the predicted timestamp. For example, a structured segmentation task may be implemented by the MSA algorithm 114, such that large-scale, non-overlapping segments of a given audio signal (e.g., verse, chorus) may be identified. Potential applications include, but are not limited to improving intra-track navigation, yield enhanced segment-level music recommendation systems, produce educational visualization tools to better understand musical pieces. This task is often divided in two sub problems: boundary detection and structural grouping. The former identifies the beginning and end times of each music segment within a piece, and the latter labels these segments based on their acoustic similarity. As another example, most music structure algorithms may accept different types of features in order to discover structural relations in harmony, timbre, loudness or a combination of them. Each of the features may depend on additional analysis parameters such as sampling rate, FFT size, and hop size. Furthermore, the MSA may utilize a beat-tracker to aggregate all the features at a beat level, thus obtaining the so-called beat-synchronous representations. This process, reduces the number of feature vectors while introducing tempo invariance. As discussed herein, the feature of nearness for similar song fragments may be employed as an additional feature used by MSA.

Figure 2:
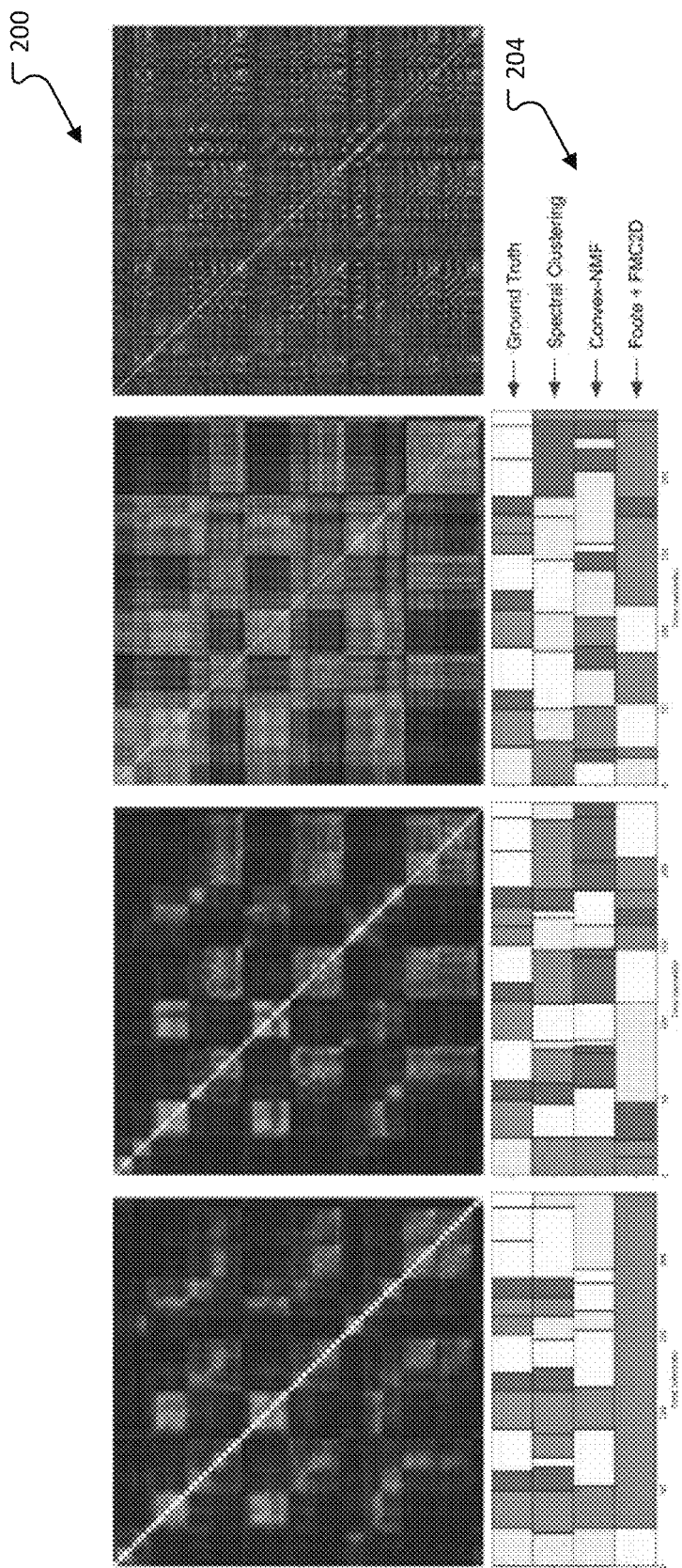
FIG. 2 shows self-similarity matrices (SSMs) in accordance with examples of the present disclosure.

FIG. 2 presents four self-similarity matrices (SSMs) 200 in accordance with examples of the present disclosure. The SSMs 200 presented in FIG. 2 are for the same song using different features. More specifically, a pairwise Euclidean distance matrix may first be calculated to which a Gaussian kernel may be applied to derive a pairwise similarity. The left two matrices utilize a deep neural network trained with the MultiSimilarity miner module 118 and loss module 120. The two matrices on the right are based on two traditional features, MFCCs and PCPs. As depicted in FIG. 2, the learned features can considerably enhance the blocks as indicated by the images, thereby reducing the complexity faced by the implemented MSA algorithm. FIG. 2 further presents results 204 associated with three MSA algorithms 114. A first MSA algorithm presented is the spectral clustering (scluster) algorithm; the second MSA algorithm presented is the convex-NMF (cnmf) algorithm; the third algorithm presented is the foote+fmc2d (using Foote's algorithm for segmentation and FMC2d for labeling). In examples, and when compared to the ground truth, a temporal resolution may affect one or more MSA algorithms; thus some MSA algorithms may be more accurate when using beat rather than downbeat synchronized features.

Figure 3:
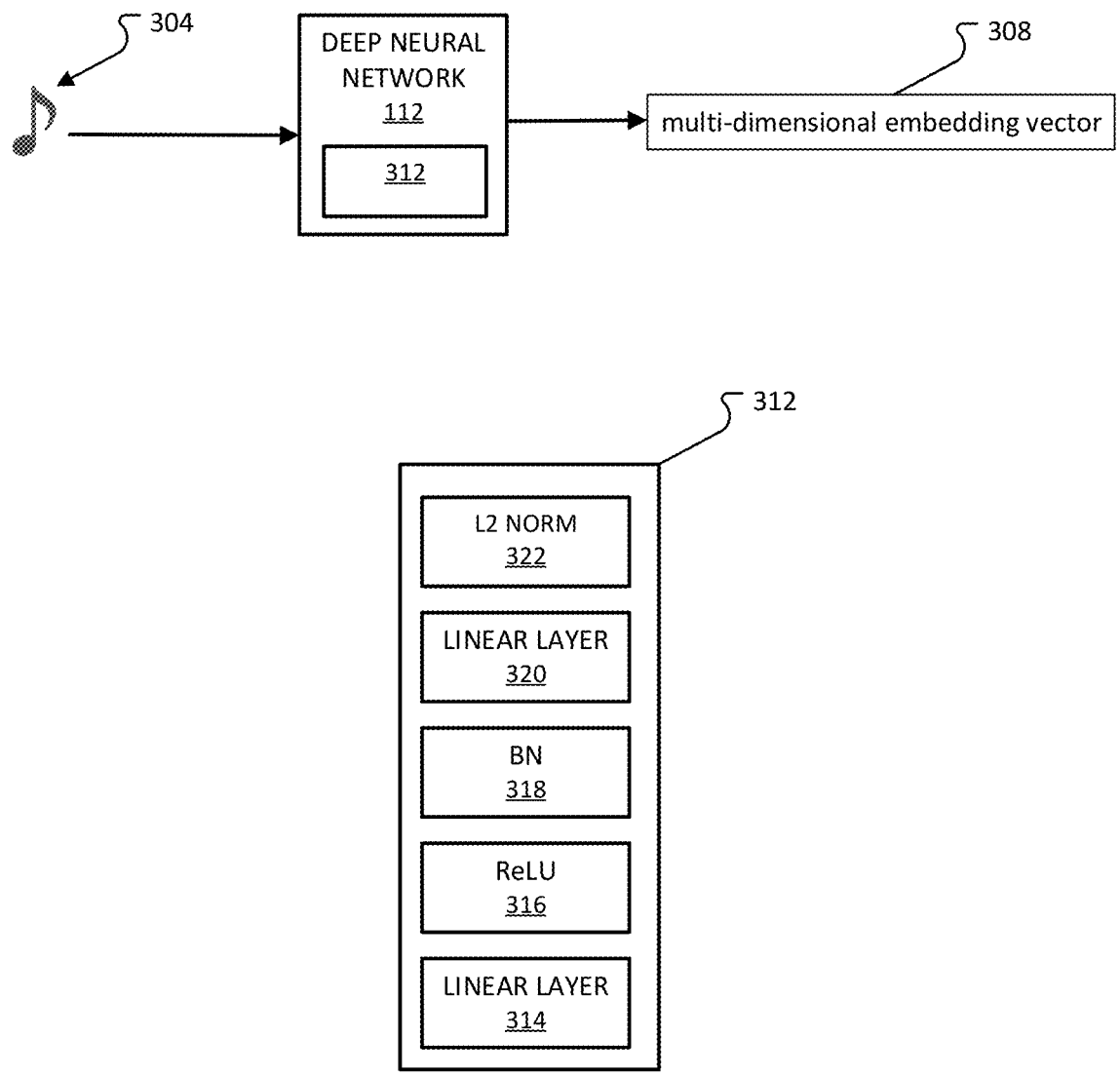
FIG. 3 depicts additional details of the deep neural network in accordance with examples of the present disclosure.

FIG. 3 depicts additional details of the deep neural network model 112 in accordance with examples of the present disclosure. As previously mentioned, the audio input 304 provided to the deep neural network model 112 may be specified as a window of a length of time (e.g. eight second) of waveform audio, and the output from the deep neural network model 112 may be a multi-dimensional embedding vector 308, where the multi-dimensional embedding vector 308 may be provided to an MSA algorithm. Of course the length of time may be greater than or less than eight seconds. In examples, a two-stage architecture may be used in which the audio is transformed to a time-frequency representation before entering the deep neural network model 112; however, it should be appreciated that a fully end-to-end deep neural network is envisioned as well. Examples of two-stage architectures, or models, include but are not limited to a Harmonic-CNN and ResNet-50. In some examples, the models are open-source; in other examples, non-open source models may be utilized. In accordance with examples of the present disclosure, the final layers (e.g., final two layers) of each model may be replaced with an embedding module 312. Where the final two layers conventionally include a dense layer plus a sigmoid layer, in examples of the present disclosure, the embedding module 312 replacing the final two layers may include a linear layer 314, a leaky ReLu layer 316, a batch normalization layer 318, another linear layer 320, and an L2 normalization layer 322 at the output. Although specific models and model types were described, it should be appreciated that any model with a similar purpose may be used for the deep neural network model 112 model.

Figure 4:
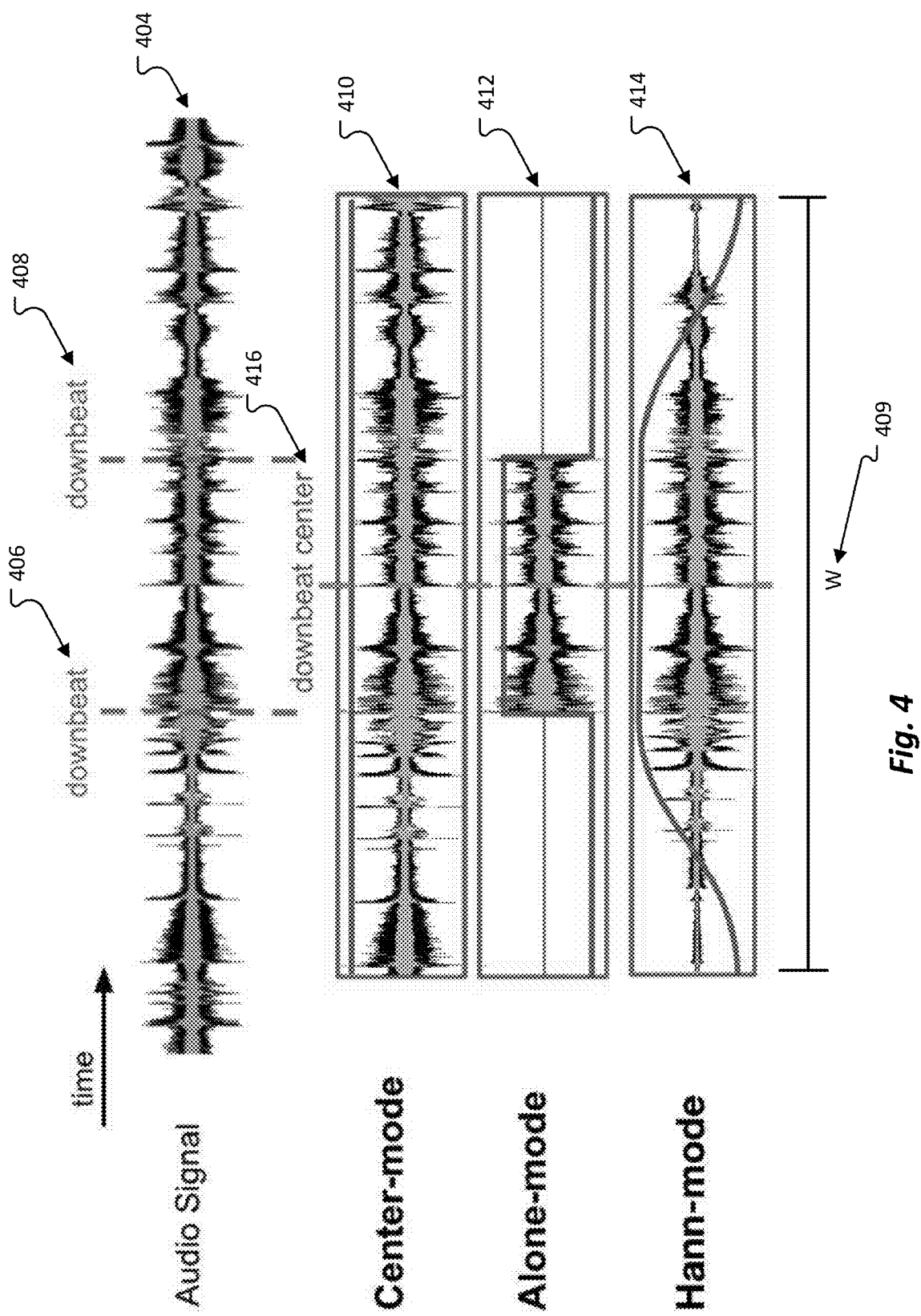
FIG. 4 depicts additional details associated with aligning an audio input signal in accordance with examples of the present disclosure.

FIG. 4 depicts additional details associated with aligning an audio input signal 404 in accordance with examples of the present disclosure. As previously discussed, the audio input and alignment module 108 may receive an audio input 101, for example an audio signal 404, and synchronize output embeddings with downbeats 406 and 408 by aligning the center of an input window to the center 416 of each bar interval. A similar procedure may apply if aligning the center of the input window to the center of the determined beats. As previously discussed, the beats/downbeats module 110 may provide timestamps associated with the downbeat 406 and downbeat 408 thereby defining a downbeat window. As previously mentioned, the input window "w" 409 may be longer than the duration of a bar (e.g., where a bar is specified as a fixed amount or time), so additional context audio may exist before and after the downbeat interval. Accordingly, a windowing function may be applied to the audio input 101 to modify or eliminate the audio context. As an example, an alone-mode 412 may be applied to the audio input such that the context audio is zeroed out. As another example, a Hann-mode 414 may be applied to the audio input, where the Hann-mode includes a Hann-shaped ramp from zero to one which is applied to the context audio. As another example, using a center-mode 410, the input window may be unaltered.

FIG. 5 depicts details of example data structures 502 and 512 in accordance with examples of the present disclosure. More specifically, the data structure 502 may be stored in memory and may include one or more previously labeled training examples. For example, the one or more previously labeled training examples may include a song identifier (e.g., Song_ID 504) and an associated label 508, where the label 508 indicates an explicit function (e.g., intro, verse, chorus) or an abstract symbol, such as but not limited to A, B, C, etc. Thus, the data structure 502 may include training examples, where the training examples include audio prior to being aligned by the input and alignment module 108. Thus, as the input and alignment module 108 may receive an audio input 101, for example an audio signal 404, and synchronize output embeddings with downbeats 406 and 408 by aligning the center of an input window to the center 416 of each bar interval, once aligned, the training example together with the alignment information may be stored in the data structure 512, where like the data structure 502, the data structure 512 may be stored in memory. The data structure 512 may include the song identifier (e.g., Song_ID 516) and the associated label 522 indicating an explicit function (e.g., intro, verse, and chorus) or an abstract symbol, such as but not limited to A, B, C, etc. In addition, the data structure 512 may include timestamps 518 and 520 specifying start and end times for the beats/downbeats.

Figure 6:
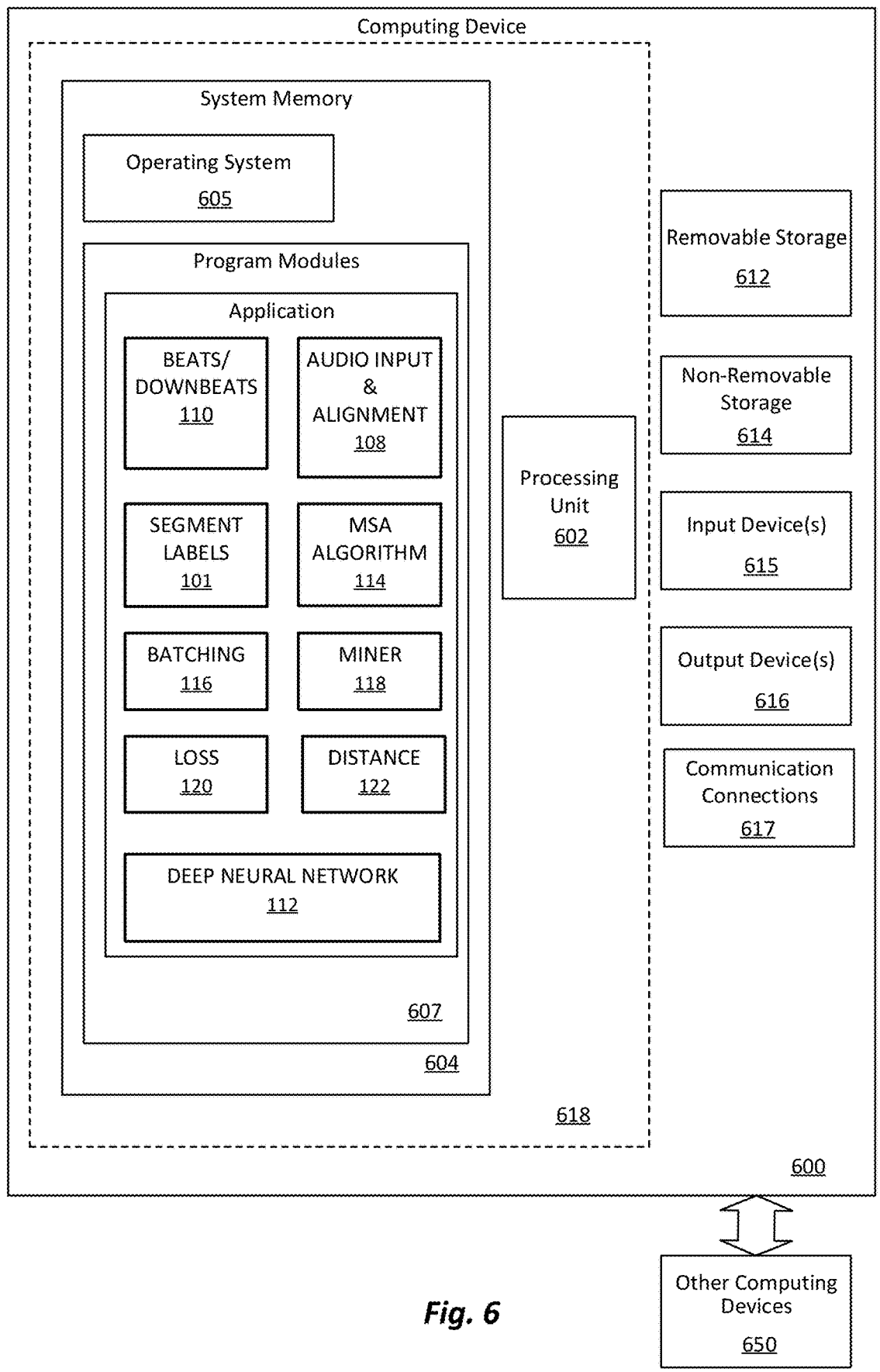
FIG. 6 depicts block diagram illustrating physical components (e.g., hardware) of a computing device with which aspects of the disclosure may be practiced.

FIG. 6 is a block diagram illustrating physical components (e.g., hardware) of a computing device 600 with which aspects of the disclosure may be practiced that can perform one or more operations as described above and herein. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 618. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 612 and a non-removable storage device 614.

As stated above, several program modules and data files may be stored in the system memory 604. While executing on the at least one processing unit 602, the program modules 606 may perform processes including, but not limited to, one or more aspects, as described herein. The application 607 may include one or more of the audio input and alignment module 108, the beats/downbeats module 110, the batching module 116, the miner module 118, the loss module 120, and the distance module 122 as described in more detail in FIGS. 1-5. In some examples, the application 607 may include one or more of the MSA algorithm 114 and/or the deep neural network model 112 as described in more detail in FIGS. 1-5.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 615 such as a keyboard, a mouse, a pen, a sound or voice input device, a touch or swipe input device, etc. The output device(s) 616 such as a display, speakers, a printer, etc. may also be included. The aforementioned devices are examples and others may be used. The computing device 600 may include one or more communication connections 617 allowing communications with other computing devices 650. Examples of suitable communication connections 617 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 612, and the non-removable storage device 614 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7:
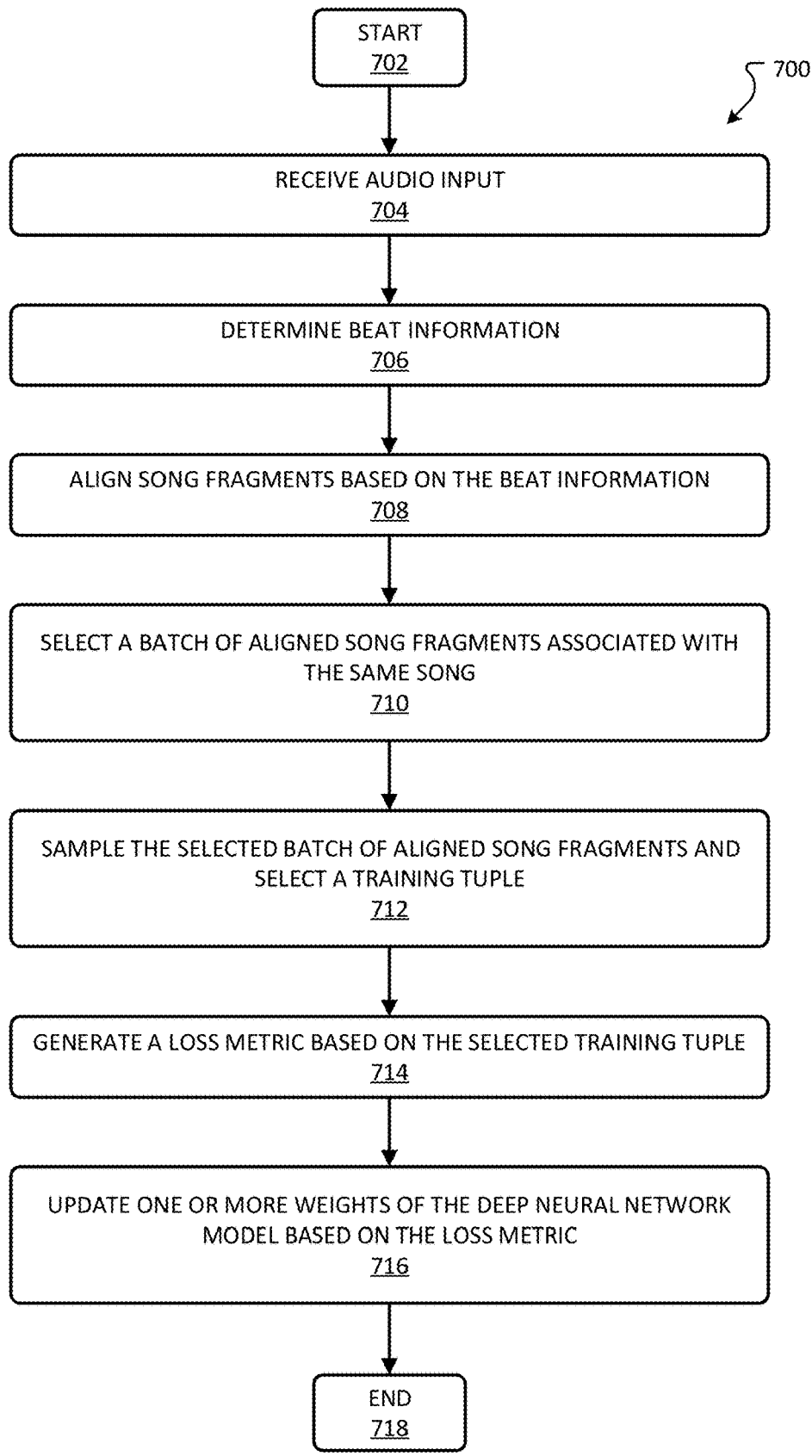
FIG. 7 shows a flowchart for using supervised metric learning to train a deep neural network model in accordance with examples of the present disclosure.

FIG. 7 provides additional details of a method 700 for using supervised metric learning to train a deep neural network model that, for a given song, will embed audio fragments of different some song sections farther apart than audio fragments form the same section. A general order for the steps of a 700 is shown in FIG. 7. Generally, the method 700 starts at 702 and ends at 734. The method 700 may include more or fewer steps or may arrange the order of the steps differently than those shown in FIG. 7. The method 700 can be executed as a set of computer-executable instructions executed by a computer system and encoded or stored on a computer readable medium. In the illustrative aspect, the method 700 is executed by a computing device (e.g., 600) associated with a user. However, it should be appreciated that aspects of the method 700 may be performed by one or more processing devices, that may include but are not limited to the computing device 600 or a server. Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method 700 starts at 702, where flow may proceed to 704. At 704, the computing device receives audio input including a plurality of song fragments from a plurality of songs. The method may proceed to 706, where the computing device may determine beat information. In examples, the beat information may correspond to a time stamp for a beat and/or a time stamp for a downbeat. As previously mentioned, the beat information may be estimated at the beats/downbeats module 110 using a madmom approach. Of course, other methods and approaches for obtaining beat and/or downbeat information are contemplated. The method 700 may then proceed to 708, where for each song fragment of the plurality of song fragments, an aligning function is performed to center the song fragment based on the beat information, thereby creating a plurality of aligned song fragments. In examples, the beats/downbeats module 110 (FIG. 1) may provide timestamps associated with the downbeat 406 and downbeat 408 (FIG. 4) thereby defining a downbeat window. As previously mentioned, the input window "w" 409 (FIG. 4) may be longer than the duration of a bar (e.g., where a bar is specified as a fixed amount or time), so additional context audio may exist before and after the downbeat interval. Accordingly, a windowing function may be applied to the audio input 101 (FIG. 1) to modify or eliminate the audio context. As an example, an alone-mode may be applied to the audio input such that the context audio is zeroed out. As another example, a Hann-mode may be applied to the audio input, where the Hann-mode includes a Hann-shaped ramp from zero to one which is applied to the context audio. As another example, using a center-mode, the input window may be unaltered.

The method 700 may then proceed 710 where for each song fragment of the plurality of song fragments, an embedding is obtained from the deep neural network. Further, a batch of aligned song fragments from the plurality of aligned song fragments may be selected, where the batch of aligned song fragments are associated with a same song of the plurality of songs. The method 700 may then proceed to 712 where from the selected batch of aligned song fragments, a training tuple is selected. From the training tuple, a loss metric may be generated at 714 and one or more weights of the deep neural network model may be updated based on the loss metric at 716. The method 700 may then end at 718. Thus, once trained, the deep neural network outputs embeddings for song fragments having a same label that are nearer to one another than for song fragments having different labels.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for using supervised metric learning is utilized during the training of the deep neural network model according to at least the examples provided in the sections below:

(A1) In one aspect, some examples include a method for implementing supervised metric learning during a training of a deep neural network model. The method may include: implementing a deep neural network configured to receive a song and output embeddings representing the song; and implementing a music structure analysis framework configured to receive the embeddings, segment the embeddings, and detect repeated portions of the song, wherein a training of the deep neural network is implemented by supervised metric learning comprising: receiving audio input including a plurality of song fragments from a plurality of songs; for each song fragment of the plurality of song fragments, determining beat information; for each song fragment of the plurality of song fragments, performing an aligning function to center the song fragment based on the beat information, thereby creating a plurality of aligned song fragments; for each song fragment of the plurality of song fragments, obtaining an embedding from the deep neural network model; selecting a batch of aligned song fragments from the plurality of aligned song fragments, the batch of aligned song fragments being associated with a same song of the plurality of songs; sampling the selected batch of aligned song fragments and selecting a training tuple; generating a loss metric based on the selected training tuple; and updating one or more weights of the deep neural network model based on the loss metric.

(A2) In some examples of A1, each song fragment includes a label corresponding to repeated portion of a respective song.

(A3) In some examples of A1-A2, the method further includes: for each song fragment of the plurality of song fragments, applying a windowing function to modify audio context associated with the respective song fragment.

(A4) In some examples of A1-A3, the selected training tuple includes multiple aligned song fragments of the plurality of aligned song fragments having a different label.

(A5) In some examples of A1-A4, the method further includes: shuffling the plurality of aligned song fragments before selecting the batch of aligned song fragments from the plurality of aligned song fragments.

(A6) In some examples of A1-A5, once trained, the deep neural network model outputs embeddings for song fragments having a same label that are nearer to one another than for song fragments having different labels.

(A7) In some examples of A1-A6, the method further includes: providing the output embeddings to a music structure analysis framework that segments and detects repeated song portions.

(A8) In some examples of A1-A7, the deep neural network includes an embedding module that includes a linear layer, a leaky ReLU layer, a batch normalization layer, and a normalization layer.

In yet another aspect, some examples include a system including one or more processors and memory coupled to the one or more processors, the memory storing one or more instructions which when executed by the one or more processors, causes the one or more processors to perform any of the methods described herein (e.g., A1-A8 described above).

In yet another aspect, some examples include a computer-readable storage medium storing one or more programs for execution by one or more processors of a device, the one or more programs including instructions for performing any of the methods described herein (e.g., A1-A8 described above).

(B1) In one aspect, some examples include an apparatus for implementing supervised metric learning during a training of a deep neural network model. The apparats may include at least one processor and a non-transitory computer-readable medium storing therein computer program code including instructions for one or more programs that, when executed by the processor, cause the processor to: implement a music structure analysis framework configured to receive embeddings representing a song from a deep neural network model, segment the embeddings, and detect repeated portions of the song; and implement supervised metric learning during a training of the deep neural network model by: receiving audio input including a plurality of song fragments from a plurality of songs; for each song fragment of the plurality of song fragments, determining beat information; for each song fragment of the plurality of song fragments, performing an aligning function to center the song fragment based on the beat information, thereby creating a plurality of aligned song fragments; for each song fragment of the plurality of song fragments, obtaining an embedding from the deep neural network; selecting a batch of aligned song fragments from the plurality of aligned song fragments, the batch of aligned song fragments being associated with a same song of the plurality of songs; sampling the selected batch of aligned song fragments and selecting a training tuple comprising; generating a loss metric based on the selected training tuple; and updating one or more weights of the deep neural network model based on the loss metric.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for implementing supervised metric learning during a training of a deep neural network model, the method comprising:
   implementing a deep neural network model configured to receive a song and output embeddings representing the song; and
   implementing a music structure analysis framework configured to receive the embeddings, segment the embeddings, and detect repeated portions of the song,
   wherein a training of the deep neural network model is implemented by supervised metric learning comprising:
      receiving audio input including a plurality of song fragments from a plurality of songs;
      for each song fragment of the plurality of song fragments, determining beat information;
      for each song fragment of the plurality of song fragments, performing an aligning function to center the song fragment based on the beat information, applying a windowing function to the song fragment based on the center of the song fragment, the windowing function removing at least some audio context of the song fragment, and thereby creating a plurality of aligned song fragments;
      for each song fragment of the plurality of song fragments, obtaining an embedding from the deep neural network model;
      selecting a batch of aligned song fragments from the plurality of aligned song fragments, the batch of aligned song fragments being associated with a same song of the plurality of songs;
      sampling the selected batch of aligned song fragments and selecting a training tuple;
      generating a loss metric based on the selected training tuple; and
      updating one or more weights of the deep neural network model based on the loss metric.

2. The method according to claim 1, wherein each song fragment includes a label corresponding to repeated portion of a respective song.

3. The method according to claim 2, further comprising:
   for each song fragment of the plurality of song fragments, applying a windowing function to modify audio context associated with the respective song fragment.

4. The method according to claim 2, wherein the selected training tuple includes multiple aligned song fragments of the plurality of aligned song fragments having a different label.

5. The method according to claim 2, further comprising:
   shuffling the plurality of aligned song fragments before selecting the batch of aligned song fragments from the plurality of aligned song fragments.

6. The method according to claim 2, wherein once trained, the deep neural network model outputs embeddings for song fragments having a same label that are nearer to one another than for song fragments having different labels.

7. The method according to claim 6, further comprising:
   providing the output embeddings to the music structure analysis framework that segments and detects repeated song portions.

8. The method according to claim 1, wherein the deep neural network model includes an embedding module that includes a linear layer, a leaky ReLU layer, a batch normalization layer, and a normalization layer.

9. An apparatus comprising:
   at least one processor and a non-transitory computer-readable medium storing therein computer program code including instructions for one or more programs that, when executed by the processor, cause the processor to:
   implement a deep neural network model configured to receive a song and output embeddings representing the song; and
   implement a music structure analysis framework configured to receive the embeddings segment the embeddings, and detect repeated portions of the song,
   wherein a training of the deep neural network model is implemented by supervised metric learning comprising:
      receiving audio input including a plurality of song fragments from a plurality of songs;
      for each song fragment of the plurality of song fragments, determining beat information;
      for each song fragment of the plurality of song fragments, performing an aligning function to center the song fragment based on the beat information, applying a windowing function to the song fragment based on the center of the song fragment, the windowing function removing at least some audio context of the song fragment, and thereby creating a plurality of aligned song fragments;
      for each song fragment of the plurality of song fragments, obtaining an embedding from the deep neural network model;
      selecting a batch of aligned song fragments from the plurality of aligned song fragments, the batch of aligned song fragments being associated with a same song of the plurality of songs;
      sampling the selected batch of aligned song fragments and selecting a training tuple;
      generating a loss metric based on the selected training tuple; and
      updating the one or more weights of the deep neural network model based on the loss metric.

10. The apparatus of claim 9, wherein each song fragment includes a label corresponding to repeated portion of a respective song.

11. The apparatus of claim 10, wherein implementing the supervised metric learning during the training of the deep neural network model further includes:
   for each song fragment of the plurality of song fragments, applying a windowing function to modify audio context associated with the respective song fragment.

12. The apparatus of claim 10, wherein the selected training tuple includes multiple aligned song fragments of the plurality of aligned song fragments having a different label.

13. The apparatus of claim 10, wherein implementing the supervised metric learning during the training of the deep neural network model further includes:
shuffling the plurality of aligned song fragments before selecting the batch of aligned song fragments from the plurality of aligned song fragments.

14. The apparatus of claim 10, wherein once trained, the deep neural network model outputs embeddings for song fragments having a same label that are nearer to one another than for song fragments having different labels.

15. The apparatus of claim 10, wherein the deep neural network model includes an embedding module that includes a linear layer, a leaky ReLU layer, a batch normalization layer, and a normalization layer.

16. A non-transitory computer-readable storage medium including instructions, which when executed by a processor, cause the processor to:
implement a deep neural network model configured to receive a song and output embeddings representing the song; and
implement a music structure analysis framework configured to receive the embeddings segment the embeddings, and detect repeated portions of the song,
wherein a training of the deep neural network model is implemented by supervised metric learning comprising:
receive audio input including a plurality of song fragments from a plurality of songs;
for each song fragment of the plurality of song fragments, determine beat information;
for each song fragment of the plurality of song fragments, perform an aligning function to center the song fragment based on the beat information, applying a windowing function to the song fragment based on the center of the song fragment, the windowing function removing at least some audio context of the song fragment, and thereby creating a plurality of aligned song fragments;
for each song fragment of the plurality of song fragments, obtain an embedding from the deep neural network model;
select a batch of aligned song fragments from the plurality of aligned song fragments, the batch of aligned song fragments being associated with a same song of the plurality of songs;
sample the selected batch of aligned song fragments and selecting a training tuple;
generate a loss metric based on the selected training tuple; and
update the one or more weights of the deep neural network model based on the loss metric.

17. The non-transitory computer-readable medium of claim 16, wherein each song fragment includes a label corresponding to repeated portion of a respective song.

18. The non-transitory computer-readable medium of claim 17, wherein the instructions, when executed by the processor, cause the processor to:
for each song fragment of the plurality of song fragments, apply a windowing function to modify audio context associated with the respective song fragment.

19. The non-transitory computer-readable medium of claim 17, wherein the selected training tuple includes multiple aligned song fragments of the plurality of aligned song fragments having a different label.

20. The non-transitory computer-readable medium of claim 17, wherein the instructions, when executed by the processor, cause the processor to:
shuffling the plurality of aligned song fragments before selecting the batch of aligned song fragments from the plurality of aligned song fragments.

* * * * *